United States Patent Office 2,805,228
Patented Sept. 3, 1957

2,805,228

NEW SYNTHESIS OF METHYLENE SULFATE BY REACTION OF PARAFORMALDEHYDE WITH SULFUR TRIOXIDE IN CHLORINATED HYDROCARBON SOLVENT

James L. Smith, Kingsport, Tenn., assignor to Eastman Kodak Company, Rochester, N. Y., a corporation of New Jersey No Drawing. Application November 12, 1954, Serial No. 468,585

1 Claim. (Cl. 260—327)

The present invention relates to the preparation of methylene sulfate by the sulfation of paraformaldehyde with sulfur trioxide. The reaction may be represented empirically as follows:

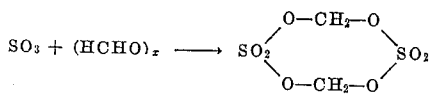

Methylene sulfate is a very useful compound in a number of respects. For instance, it may be reacted with tertiary amines to produce compounds of the general formula

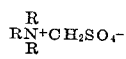

which are surface active if one of the R groups has a chain length of at least eight carbon atoms. Methylene sulfate may also be used as a methyleneating agent. For example, catechol with methylene sulfate yields catechol methylene ether; monohydric phenols yield

and with alcohols, acetals may be obtained.

Due to the strong oxidizing tendency of sulfur trioxide it is customary to employ for this reaction a sulfur trioxide complex in which the sulfur trioxide is tied up with an associated chemical, e. g. sulfuric acid, hydrochloric acid or the like so that in effect it is "tamed" and does react with less violence and little or no oxidation of the paraformaldehyde. This method provides methylene sulfate in good yield but is subject to pronounced disadvantages. For instance, the sulfating complexes such as fuming sulfuric acid (commonly employed) result in side reactions and formation of considerable amounts of by-product. e. g. partially spent sulfuric acid. Also, the procedure is slow and time consuming. Also, if the complex must be formed in situ, a considerable amount of heat is liberated and must be dissipated to avoid charring.

The present invention is based upon the discovery of a novel and improved method for the preparation of methylene sulfate by the sulfation of paraformaldehyde with sulfur trioxide. The new procedure obviates the use of a complex of sulfur trioxide, is faster, simpler, more convenient and cleaner than previously known techniques. It results in still better yields and does not require the dissipation of as large amounts of heat. Furthermore, it does not result in any significant side reactions or the occurrence of any significant amounts of by-products. One of the most valuable features of the novel method is that it produces a reaction product mixture comprising precipitated methylene sulfate in a liquid non-solvent from which the methylene sulfate can be readily recovered by filtration.

In accordance with the present invention, methylene sulfate is prepared by reacting paraformaldehyde with free sulfur trioxide in an inert liquid halogenated hydrocarbon which is a solvent for both the paraformaldehyde and the sulfur trioxide. In an advantageous embodiment, the invention comprises the use of a chlorinated hydrocarbon solvent.

The method may be carried out in any of several obvious ways, but I prefer to start with a solution of sulfur trioxide in the halogenated hydrocarbon solvent, introduce this into a reaction vessel and add the paraformaldehyde slowly to the vessel containing the sulfur trioxide solution. Preferably the vessel is maintained at a temperature below room temperature and the paraformaldehyde is added carefully so that the temperature is allowed to rise slowly and the reaction is not allowed to proceed until the paraformaldehyde is substantially dissolved. During or after solution of the paraformaldehyde, precipitation of methylene sulfate can be obtained by allowing the temperature of the reaction vessel to rise or by heating the vessel to a temperature of preferably about 35° C. or more. Temperatures of up to 95° C. can be employed, the optimum temperature being suitably determined from the nature and amount of solvent employed. Since the methylene sulfate formed is insoluble in the solvents employed, it may be freed by filtration or decantation of the solvent.

The solvents which may be employed are halogenated, low molecular weight aliphatic hydrocarbons including 1,2 - dichloroethane, 1,1,2,2 - tetrachloroethane, chloroform, 1,1,2 - trichloro - 1,2,2 - trifluoroethane, etc. The amount of solvent used is not critical although there must be enough solvent present to provide for easy handling of the reaction and to facilitate dissipation of the heat of reaction. The methylene sulfate obtained by either method may be pure enough for some purposes, but can be further purified by washing with cold diethyl ether, acetone, dioxane, water, or combinations of these solvents. For most purposes, a wash with a little cold ether or acetone to remove the adhering halogenated hydrocarbon followed with cold water leaves a pure, white, granular product which may be dried over anhydrous calcium chloride and kept indefinitely.

The invention is illustrated in the following examples in which the parts of reactant materials specified are by weight.

*Example I*

Three and seventy-five one hundredths (3.75) parts of paraformaldehyde were slowly added with stirring to 10 parts of sulfur trioxide dissolved in 100 parts of 1,2-dichloroethane previously cooled to about 10° C. The temperature was slowly allowed to rise to room temperature and the solution was then heated to 35° C. The paraformaldehyde dissolved, then the methylene sulfate precipitated. The material was collected on a sintered glass filter, washed with about 20 parts of cold ether followed by 30 parts of cold water. The material was dried in a desiccator over anhydrous calcium chloride. Eleven parts of methylene sulfate were obtained. A 0.506 gram sample was hydrolyzed in an aqueous alkaline solution; $9.1 \times 10^{-3}$ equivalents of acid were obtained, theoretical for methylene sulfate is $9.2 \times 10^{-3}$.

*Example II*

The procedure of Example I was repeated using chloroform as the solvent. The methylene sulfate obtained was 83% of the theoretical yield.

*Example III*

The procedure of Example I was repeated using as solvent 1,1,2,2-tetrachloroethane. Methylene sulfate was obtained in 85% yield.

Example IV

Methylene sulfate was prepared as in Example I except that trichlorotrifluoroethane, Freon 113, was used in place of 1,2-dichloroethane. Eight parts of methylene sulfate were obtained.

Example V

Methlyene sulfate was prepared as in Example 3 except that the temperature was slowly allowed to rise and the material was heated to 90° C. instead of 35° C. before the product was filtered. An 80% yield was obtained.

What I claim is:

In the procedure for the preperation of methylene sulfate by the sulfonation of paraformaldehyde, an improved method comprising the steps of forming a solution of paraformaldehyde and free sulfur trioxide in an inert solvent comprising a halogenated low molecular weight aliphatic hydrocarbon, and bringing the solution to a temperature within the range of about 10° C. to about 90° C. suitable for reaction of the paraformaldehyde with the free sulfur trioxide whereby to form a crystalline precipitate of methylene sulfate.

References Cited in the file of this patent

UNITED STATES PATENTS 2,695,308    Gilbert _____ Sept. 17, 1952

OTHER REFERENCES

Baker: J. Chem. Soc., 1931; 1765–71.